United States Patent
Inagaki

(10) Patent No.: US 7,925,108 B2
(45) Date of Patent: Apr. 12, 2011

(54) ENCODING DEVICE AND DYNAMIC IMAGE RECORDING SYSTEM HAVING THE ENCODING DEVICE

(75) Inventor: Hiroki Inagaki, Osaka (JP)

(73) Assignee: Panasonic Corporation, Osaka (JP)

( * ) Notice: Subject to any disclaimer, the term of this patent is extended or adjusted under 35 U.S.C. 154(b) by 879 days.

(21) Appl. No.: 11/908,212

(22) PCT Filed: Mar. 10, 2006

(86) PCT No.: PCT/JP2006/304685
§ 371 (c)(1),
(2), (4) Date: Sep. 10, 2007

(87) PCT Pub. No.: WO2006/098226
PCT Pub. Date: Sep. 21, 2006

(65) Prior Publication Data
US 2009/0010559 A1    Jan. 8, 2009

(30) Foreign Application Priority Data
Mar. 14, 2005   (JP) .................................. 2005-070675

(51) Int. Cl.
*G06K 9/36* (2006.01)
(52) U.S. Cl. ........................................ 382/248; 382/232
(58) Field of Classification Search ........... 382/232–251
See application file for complete search history.

(56) References Cited

U.S. PATENT DOCUMENTS
6,483,945 B1 * 11/2002 Kato .............................. 382/236
2005/0141773 A1 * 6/2005 Mizuno ........................ 382/239

FOREIGN PATENT DOCUMENTS
| JP | 03-166887 | 7/1991 |
| JP | 05-260308 | 10/1993 |
| JP | 07-236137 | 9/1995 |
| JP | 10-243397 | 9/1998 |
| JP | 2001-078194 | 3/2001 |

OTHER PUBLICATIONS

International Search Report for corresponding Application No. PCT/JP2006/304685 mailed Jun. 13, 2006.
Form PCT/ISA/237 and partial English translation, Jun. 13, 2006.

* cited by examiner

*Primary Examiner* — Duy M Dang
(74) *Attorney, Agent, or Firm* — Renner, Otto, Boisselle & Sklar, LLP

(57) ABSTRACT

To always maintain good image quality no matter whether the target bit rate for encoding is high or low.
An encoder 210 includes: a converting section 103 for converting picture data representing a moving picture into a coefficient including a plurality of frequency components on a predetermined unit basis; a determining section 212 for determining a matrix to define a frequency bit allocation characteristic based on the resolution of the moving picture and a target bit rate for encoding that has been specified in advance; a quantization section 204 for quantizing each coefficient based on the matrix determined, thereby generating a quantized value; and an encoding section 105 for encoding the quantized value to generate encoded data of the moving picture.

8 Claims, 12 Drawing Sheets

FIG.2

| quantiser_scale_code | quantiser_scale[qscale_type] | |
|---|---|---|
| | qscale_type = 0 | qscale_type = 1 |
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

FIG.4

| 8 | 16 | 19 | 22 | 26 | 27 | 29 | 34 |
|---|---|---|---|---|---|---|---|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

(a) FOR Intra CODING

| 16 | 16 | 16 | 16 | 16 | 16 | 16 | 16 |
|---|---|---|---|---|---|---|---|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

(b) FOR Non-Intra CODING

MPEG-2 DEFAULT MATRIX

FIG.5

| 8 | 16 | 19 | 22 | 26 | 27 | 29 | 34 |
|---|---|---|---|---|---|---|---|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

(a) FOR Intra CODING

| 16 | 17 | 18 | 19 | 20 | 21 | 22 | 23 |
|---|---|---|---|---|---|---|---|
| 17 | 18 | 19 | 20 | 21 | 22 | 23 | 24 |
| 18 | 19 | 20 | 21 | 22 | 23 | 24 | 25 |
| 19 | 20 | 21 | 22 | 23 | 24 | 26 | 27 |
| 20 | 21 | 22 | 23 | 25 | 26 | 27 | 28 |
| 21 | 22 | 23 | 24 | 26 | 27 | 28 | 30 |
| 22 | 23 | 24 | 26 | 27 | 28 | 30 | 31 |
| 23 | 24 | 25 | 27 | 28 | 30 | 31 | 33 |

(b) FOR Non-Intra CODING

TM5 QUANTIZATION MATRIX

FIG.6

| 8 | 8 | 9 | 11 | 13 | 13 | 14 | 17 |
|---|---|---|----|----|----|----|----|
| 8 | 8 | 11 | 12 | 13 | 14 | 17 | 18 |
| 9 | 11 | 13 | 13 | 14 | 17 | 17 | 19 |
| 11 | 11 | 13 | 13 | 14 | 17 | 18 | 20 |
| 11 | 13 | 13 | 14 | 16 | 17 | 20 | 24 |
| 13 | 13 | 14 | 16 | 17 | 20 | 24 | 29 |
| 13 | 13 | 14 | 17 | 19 | 23 | 28 | 34 |
| 13 | 14 | 17 | 19 | 23 | 28 | 34 | 41 |

(a) FOR Intra CODING

| 8 | 8 | 8 | 8 | 8 | 8 | 8 | 8 |
|---|---|---|---|---|---|---|---|
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |

(b) FOR Non-Intra CODING

HALF OF MPEG-2 DEFAULT MATRIX

FIG.7

| ENCODING CONDITION | TARGET BIT RATE | RESOLUTION | QUANTIZATION MATRIX |
|---|---|---|---|
| (1) | 8.0[Mbps] | 720x480 | FIG.6 |
| (2) | 4.0[Mbps] | 720x480 | FIG.4 |
| (3) | 2.0[Mbps] | 720x480 | FIG.5 |

FIG.8

| ENCODING CONDITION | TARGET BIT RATE | RESOLUTION | QUANTIZATION MATRIX |
|---|---|---|---|
| (1) | 50[Mbps] | 1920x1080 | FIG.6 |
| (2) | 25[Mbps] | 1920x1080 | FIG.4 |
| (3) | 15[Mbps] | 1920x1080 | FIG.5 |
| (4) | 8.0[Mbps] | 720x480 | FIG.6 |
| (5) | 4.0[Mbps] | 720x480 | FIG.4 |
| (6) | 2.0[Mbps] | 720x480 | FIG.5 |
| (7) | 1.5[Mbps] | 352x480 | FIG.4 |
| (8) | 1.0[Mbps] | 352x480 | FIG.5 |

FIG.12

| ENCODING CONDITION | TARGET BIT RATE | RESOLUTION | QUANTIZATION MATRIX (TYPE1) | QUANTIZATION MATRIX (TYPE1) |
|---|---|---|---|---|
| (1) | 8.0[Mbps] | 720x480 | FIG.6 | FIG.4 |
| (2) | 4.0[Mbps] | 720x480 | FIG.4 | FIG.5 |
| (3) | 2.0[Mbps] | 720x480 | FIG.5 | FIG.7 |

FIG.13

| 8 | 16 | 19 | 22 | 26 | 27 | 29 | 34 |
|---|---|---|---|---|---|---|---|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

| 16 | 18 | 20 | 22 | 24 | 26 | 28 | 30 |
|---|---|---|---|---|---|---|---|
| 18 | 20 | 22 | 24 | 26 | 28 | 30 | 32 |
| 20 | 22 | 24 | 26 | 28 | 30 | 32 | 34 |
| 22 | 24 | 26 | 28 | 30 | 32 | 36 | 38 |
| 24 | 26 | 28 | 30 | 34 | 36 | 38 | 40 |
| 26 | 28 | 30 | 32 | 36 | 38 | 40 | 44 |
| 28 | 30 | 32 | 36 | 38 | 40 | 44 | 46 |
| 30 | 32 | 34 | 38 | 40 | 44 | 46 | 50 |

(a) FOR Intra CODING          (b) FOR Non-Intra CODING

QUANTIZATION MATRIX WITH STEEPER QUANTIZATION CHARACTERISTIC GRADIENT THAN TM5

ENCODING DEVICE AND DYNAMIC IMAGE RECORDING SYSTEM HAVING THE ENCODING DEVICE

TECHNICAL FIELD

The present invention relates to a technique for encoding moving picture data highly efficiently.

BACKGROUND ART

Recently, as multimedia applications have been further broadened, it has become more and more commonplace to convert information on every type of medium, including image, audio and text data, for example, into digital data and process it collectively. Among other things, the size of the digital image data (e.g., digital moving picture data, in particular) is so huge that an encoding technique for encoding the moving picture data highly efficiently is required to store and transmit that data. As exemplary encoding techniques that were developed for the purpose of encoding a moving picture, encoding schemes as like MPEG-1, 2 and 4 defined by International Organization for Standardization (ISO), are known.

According to any of these encoding schemes, before image data is subjected to orthogonal transformation and quantization, a quantization matrix is specified. The respective elements of the quantization matrix are provided for their associated frequency components of an orthogonal transformation coefficient. And the orthogonal transformation coefficient is quantized with the values of those elements. The bit allocation property in a frequency space can be controlled according to how to define the value of the quantization matrix. That is why the quantization matrix should represent one of the features of the quantization processing (which will be referred to herein as "quantization characteristic").

Two different quantization matrices can be defined for an intra coding process and an inter-picture (or non-intra) predictive coding process, respectively. As a result, two different frequency bit allocations can be made according to the method of prediction. In addition, according to the MPEG-2 standard, mutually different quantization matrices can be set for luminance data and chrominance data.

FIG. 1 shows a configuration for a conventional moving picture encoder 100, which includes an input picture memory 101, a subtracting section 102, an orthogonal transformation section 103, a quantization section 104, a variable-length encoding section 105, an inverse quantization section 106, an inverse orthogonal transformation section 107, an adding section 108, a reference picture memory 109, a motion detection/motion compensation section 110 and a rate control section 111.

The quantization operation using the quantity matrix is performed by the quantization section 104. First, the quantization section 104 multiplies the respective coefficient values of the quantization matrix by a quantization scale, thereby calculating quantization parameters. The quantization scale is generated by the rate control section 111 based on a target bit rate in encoding and the code size of the encoded picture data that has been generated by the variable-length encoding section 105.

Then, the quantization section 104 quantizes the respective frequency component values of the orthogonal transformation coefficient, which has been supplied from the orthogonal transformation section 103, with their associated quantization parameters, and outputs the results as quantized values. The quantization operation processing includes, as a main processing step, dividing the orthogonal transformation coefficient by the quantization parameter. Next, the variable-length encoding section 105 encodes each of those quantized values and outputs the result. In this manner, encoded picture data can be obtained.

The MPEG-2 standard defines standard quantization matrices that are used unless otherwise specified (which will be referred to herein as "default matrices") as shown in FIGS. 4(a) and 4(b). For example, in the quantization matrix for intra coding shown in FIG. 4(a), the closer to the lower right corner of the matrix an element is, the greater the weight of that element is. As a result, a high-frequency component of the orthogonal transformation coefficient has low quantization precision. In the default matrix for non-intra coding shown in FIG. 4(b), on the other hand, all elements have the same value and there is no difference between their weights. That is why all high-frequency components of the orthogonal transformation coefficient have the same degree of quantization precision. In other words, the intra coding matrix has such frequency bit allocation characteristic that allocates a relatively large number of bits to low-frequency components, whereas the non-intra coding matrix has such frequency bit allocation characteristic that allocates the same number of bits equally to all frequency components.

Also, in the prior art, other quantization matrices, not just the examples described above, have also been used as shown in FIGS. 5(a) and 5(b). The matrices shown in FIGS. 5(a) and 5(b) are used for the last model of the MPEG-2 standard being set and are also called "TM5 quantization matrices". As is clear from FIGS. 5(a) and 5(b), in each of these matrices, the coefficient values are weighted so as to decrease the quantity precision of high frequency components. That is why a relatively large number of bits are allocated to low-frequency components.

Supposing their quantization scales during the non-intra coding are the same, the quantized value of a high-frequency component that has been quantized using the TM5 quantization matrix becomes smaller than that of a high-frequency component that has been quantized with the MPEG-2 default matrix. As a result, the rate of the code generated can be decreased. This is because a greater amount of high-frequency component information has been cut down in the former case.

The MPEG-2 standard defines two types of quantization scales. FIG. 2 shows a quantization scale allocation table. Type 0 (qscale_type=0) and Type 1 (qscale_type=1) are defined for each of the quantization scale codes (quantiser_scale_code) #1 through #31 shown on the left column, and one of the two values is allocated as a quantization scale.

The rate control section 111 determines the value of the quantization scale by the target bit rate and the generated code size of the encoded picture data. If the quantization scale is the same, the degree of quantization precision of the frequency component, i.e., the bit allocation characteristic within the frequency space, is determined by the magnitude of the coefficient value of the quantization matrix.

As can be seen easily from the foregoing description, the quantization matrix and the quantization scale have significant influence on the quantization value. For example, Patent Document No. 1 discloses a technique for updating a quantization matrix on a screen basis according to the quantization scale.

Patent Document No. 1: Japanese Patent Application Laid-Open Publication No. 2001-78194

DISCLOSURE OF INVENTION

Problems to be Solved by the Invention

If such a quantization matrix with a relatively gentle weight gradient (i.e., which has a relatively small degree of variation between its elements) is used selectively, various problems will arise.

For example, if the quantization matrix described above is used, block noise will be produced and the quality of a picture with a predetermined resolution will be debased when the picture is encoded at a low target bit rate. This is because even the amount of information represented by low-frequency components, which would have significant impact on the viewer, should be reduced. More specifically, the amount of information represented by high frequency components cannot be reduced sufficiently only with the quantization matrix, and therefore, needs to be further reduced by increasing the quantization scale. If the quantization scale is increased, however, the amount of information represented by low-frequency components will decrease, too.

Meanwhile, even if the picture is encoded at a high target bit rate using the quantization matrix described above, the quality of the picture will be debased, too. This is because in that case, even if the quantization scale changes by only one, the picture quality will vary significantly, which will debase the picture quality noticeably. Also, if the target bit rate is high, the quantization scale often needs to be varied within a low value range by controlling the rate. In that case, even if the quantization scale has changed by only one, the bit allocation rate would change significantly within the frequency space.

An object of the present invention is to provide an apparatus that can always maintain good image quality no matter whether the target bit rate for encoding is high or low.

Means for Solving the Problems

An encoder according to the present invention includes: a converting section for converting picture data representing a moving picture into a coefficient including a plurality of frequency components on a predetermined unit basis; a determining section for determining a matrix to define a frequency bit allocation characteristic based on the resolution of the moving picture and a target bit rate for encoding that has been specified in advance; a quantization section for quantizing each said coefficient based on the matrix determined, thereby generating a quantized value; and an encoding section for encoding the quantized value to generate encoded data of the moving picture.

The quantization section may store multiple types of matrices, and the determining section may select one of the matrices for use in quantization process.

The quantization section may include circuits that are respectively associated with the multiple types of matrices, and the determining section may instruct the quantization section to change signal paths into one leading to the circuit that is associated with the matrix for use in the quantization process.

The determining section may retain a condition table that defines association of multiple different combinations of resolutions and target bit rates with the multiple types of matrices and may make reference to the condition table with the resolution of the moving picture and the pre-specified target bit rate for encoding, thereby determining the associated matrix.

The condition table retained in the determining section may define at least one of a particular numerical value and a particular numerical value range as the target bit rate.

The quantization section may store two types of matrices that are associated with two different target bit rates, respectively. If a specified target bit rate is different from any of the two target bit rates, the determining section may make calculations based on at least the target bit rate specified and the two types of matrices, thereby figuring out the matrix for use in the quantization process.

Alternatively, the quantization section may store a single matrix that is associated with a particular target bit rate, and the determining section may store in advance a step value per unit bit rate. If a specified target bit rate is different from the particular target bit rate, the determining section may make calculations based on at least the target bit rate specified, the step value and the single matrix, thereby figuring out the matrix for use in the quantization process.

A moving picture recording system according to the present invention includes: a video signal receiving section for receiving a video signal representing a moving picture and outputting picture data to present the moving picture; an encoder for outputting encoded data of the moving picture based on the picture data; and a storage section for writing the encoded data on a storage medium. The encoder includes: a converting section for converting the picture data into a coefficient including a plurality of frequency components on a predetermined unit basis; a determining section for determining a matrix to define a frequency bit allocation characteristic based on the resolution of the moving picture and a target bit rate for encoding that has been specified in advance; a quantization section for quantizing each coefficient based on the matrix determined, thereby generating a quantized value; and an encoding section for encoding the quantized value to generate encoded data of the moving picture.

A computer program according to the present invention is executed by a data processor or a data processing system for outputting encoded data of a moving picture. The computer program is defined so as to make the data processor perform, by executing the computer program, the steps of: converting image data to present the moving picture into a coefficient including a plurality of frequency components on a predetermined unit basis; determining a matrix to define a frequency bit allocation characteristic based on the resolution of the moving picture and a target bit rate for encoding that has been specified in advance; quantizing each coefficient based on the matrix determined, thereby generating a quantized value; and encoding the quantized value to generate encoded data of the moving picture.

EFFECTS OF THE INVENTION

The encoder of the present invention determines the bit allocation characteristic in the frequency space by the target bit rate for encoding and resolution information, and carries out quantization using appropriate quantization characteristic for each target image quality. As a result, good image quality can always be maintained.

Specifically, when a moving picture with a predetermined resolution is encoded at a relatively low target bit rate, a relatively large number of bits are allocated to low-frequency components. As a result, significant deterioration of image quality such as block noise can be avoided. On the other hand, when a moving picture with a predetermined resolution is encoded at a relatively high target bit rate, the variation in the number of bits allocated is reduced with respect to a variation in quantization scale. As a result, the bit allocation can be controlled more finely and the variation in image quality can be minimized.

BRIEF DESCRIPTION OF DRAWINGS

FIG. 2 is a table showing the allocation of quantization scales.

FIG. 4 shows a group of matrices compliant with the MPEG-2 standard.

FIG. 5 shows a group of matrices according to a test model.

FIG. 6 shows a group of matrices, of which the element values are approximately a half as large as those of the group of matrices shown in FIG. 4.

FIG. 7 shows a number of exemplary encoding conditions.

FIG. 8 shows exemplary encoding conditions for various situations where the target bit rates and the moving picture resolutions are both different from each other.

FIG. 12 shows a number of encoding conditions according to the second preferred embodiment.

FIG. 13 shows quantization matrices, of which the quantization characteristic has an even steeper weight gradient than the TM5 quantization matrix shown in FIG. 5.

Figure 1:
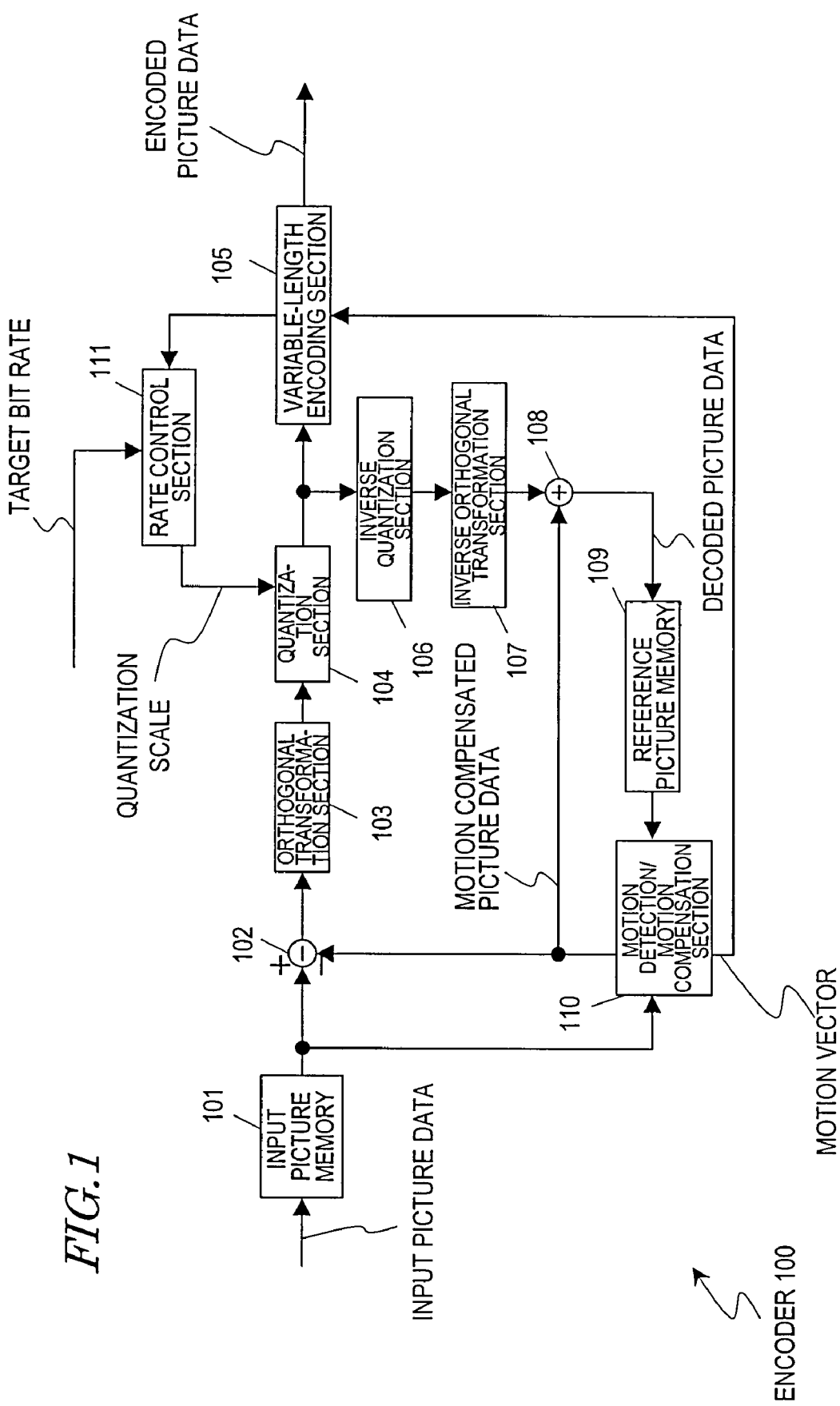
FIG. 1 shows a configuration for a conventional moving picture encoder 100.

DESCRIPTION OF REFERENCE NUMERALS 100 conventional moving picture encoder
101 input picture memory
102 subtracting section
103 orthogonal transformation section
104 quantization section
105 variable-length encoding section
106 inverse quantization section
107 inverse orthogonal transformation section
108 adding section
109 reference picture memory
110 motion detection/motion compensation section
111 rate control section
200 recorder
204 quantization section
205 video signal receiving section
210 moving picture encoder according to Embodiment 1
211 rate control section
212, 312, 412 frequency bit allocation characteristic determining section
215-1, 215-2 storage section
300 moving picture encoder according to Embodiment 2
400 moving picture encoder according to Embodiment 3
413 resolution converting section
500 moving picture decoder according to Embodiment 3

BEST MODE FOR CARRYING OUT THE INVENTION

Hereinafter, preferred embodiments of a data processor according to the present invention will be described with reference to the accompanying drawings. In the following description, the data processor is supposed to be a recorder for recording a moving picture and/or an encoder for encoding a moving picture inside a recorder.

Embodiment 1

Figure 3:
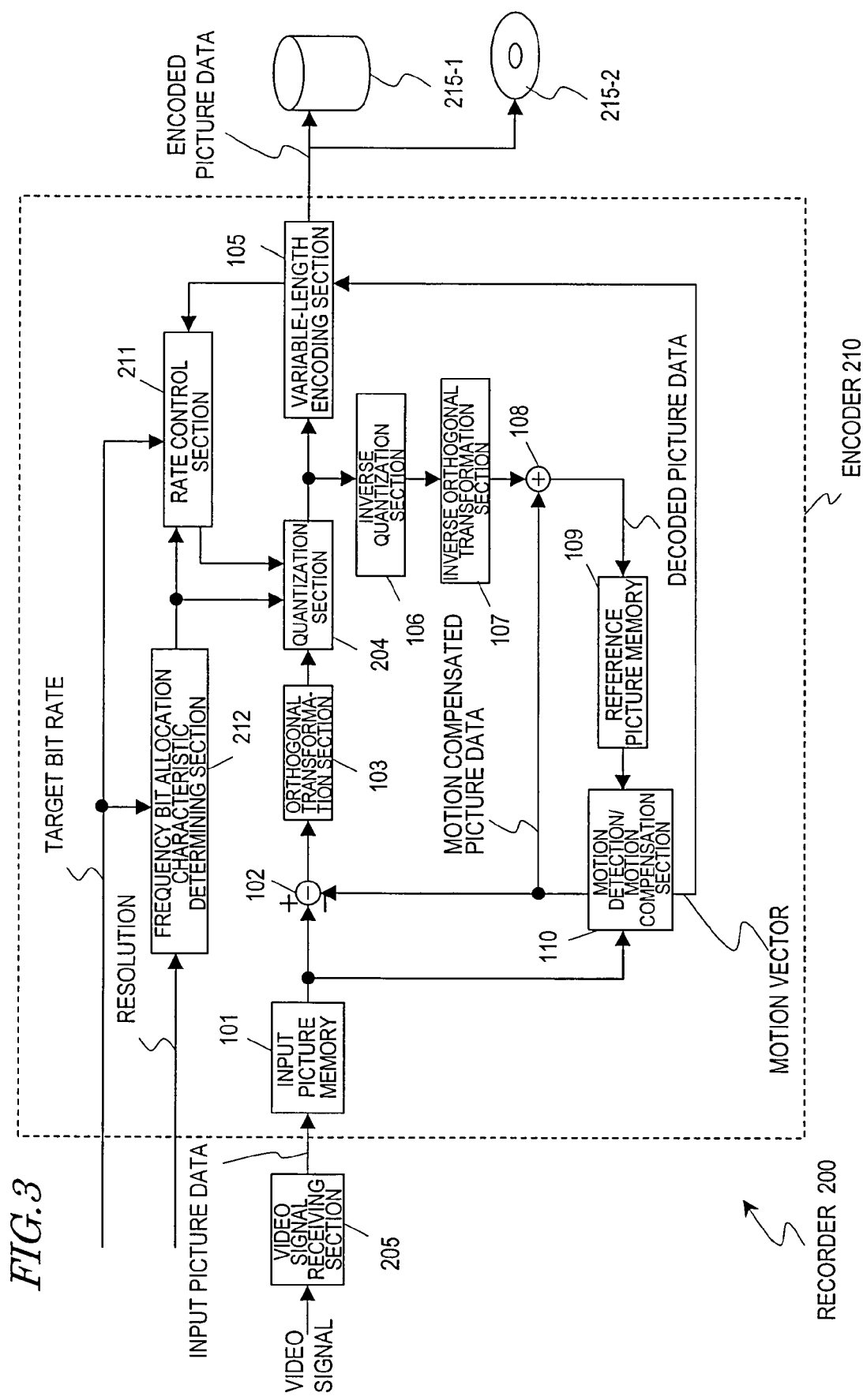
FIG. 3 shows a configuration for a recorder 200 according to a first preferred embodiment of the present invention.

FIG. 3 shows a configuration for a recorder 200 according to a first preferred embodiment of the present invention. The recorder 200 may be implemented as either a TV program recorder for receiving and writing a TV signal on a hard disk or an optical disk or a camcorder that allows the user to record video of an object on a hard disk or an optical disk with or without audio.

The recorder 200 includes a video signal receiving section 205, an encoder 210 and storage sections 215-1 and 215-2. The video signal receiving section 205 may be either a tuner that receives an analog TV signal, converts the signal into a digital signal (digital data) and then outputs the data or a CCD for outputting the video of an object as digital data.

The encoder 210 encodes the digital data representing the moving picture, thereby generating encoded picture data. The encoder 210 may be implemented as an encoder board by integrating together its circuit components on a single substrate.

For example, the storage sections 215-1 and 215-2 may be a hard disk drive and an optical disk drive, respectively. The hard disk drive and the optical disk drive can read and write the encoded picture data (video data stream) from/on a hard disk and an optical disk. It should be noted that the storage section 215-2 is illustrated as an optical disk for the sake of simplicity.

The encoder 210 may also be implemented within a single housing. In that case, the recorder 200 may be regarded as a recording system including the video signal receiving section 205 as a tuner, the encoder 210 and the storage devices 215-1 and 215-2.

Hereinafter, the encoder 210 will be described in detail. The encoder 210 includes an input picture memory 101, a subtracting section 102, an orthogonal transformation section 103, a quantization section 204, a variable-length encoding section 105, an inverse quantization section 106, an inverse orthogonal transformation section 107, an adding section 108, a reference picture memory 109, a motion detection/motion compensation section 110, a rate control section 211 and a frequency bit allocation characteristic determining section 212.

The encoder 210 encodes the picture data of the moving picture by either intra coding or inter-picture (or non-intra) predictive coding. Hereinafter, the functions of the encoder 210 will be outlined.

In the encoder 210, first, the input picture memory 101 receives the picture data, which is then converted by the orthogonal transformation section 103 into frequency component coefficients. Then, the frequency bit allocation characteristic determining section 212 (which will be simply referred to herein as the "determining section 212") determines a quantization matrix for use in the encoder process based on the resolution of the moving picture and a target bit rate for encoding that has been specified in advance.

The quantization section 204 quantizes each frequency component coefficient based on the matrix determined, thereby generating a quantized value. Then, the variable-length encoding section 105 encodes the quantized value, thereby generating and outputting moving picture encoded data.

Hereinafter, the respective components of the encoder 210 will be described one by one.

The input picture memory 101 is a memory for storing the picture data of each input picture until the data is encoded. Even when the output of the picture data is delayed due to a change of the encoding orders, the input picture memory 101 still has sufficient storage capacity. During the encoding process, the picture data of each input picture is divided into a plurality of blocks and encoded on a block-by-block basis. And the input picture memory 101 can output the picture data on a block-by-block basis.

According to the MPEG standards, a set of 16×16 pixels is called a "macroblock", while a block consisting of a smaller number of pixels (e.g., a set of 8×8 pixels) is called a "sub-macroblock". However, since the unit changes according to the type of the encoding process, the "macroblock" and "sub-macroblock" will be referred to herein as "blocks" collectively.

The subtracting section 102 receives the input picture data, which has been supplied from the input picture memory 101 on a block-by-block basis, at its non-inverting input terminal. If intra coding is going to be carried out with no motion compensation or prediction, the subtracting section 102 outputs, as it is, the input picture data that has been received at its non-inverting input terminal. On the other hand, if non-intra coding is going to be carried out with motion compensation and prediction, the subtracting section 102 receives the block-by-block motion compensated picture data from the motion detection/motion compensation section 110 at its inverting input terminal, carries out subtraction on the data, and outputs block-by-block predicted error picture data as a result of the subtraction.

The orthogonal transformation section 103 performs orthogonal transformation on the block-by-block picture data that has been supplied from the subtracting section 102, thereby converting the data into frequency components. As the orthogonal transformation, a discrete cosine transform is known, for example.

Based on the target bit rate for encoding, the code size of the encoded picture data that has been previously generated by the variable-length encoding section 105, and information about the quantization matrix determined by the determining section 212, the rate control section 211 determines the quantization scale for use in the quantization section 204. The type of the quantization scale is normally fixed but may not be fixed. The quantization scale thus determined is associated with the quantization scale code quantiser_scale_code by reference to the table shown in FIG. 2. This quantization scale code is encoded by the variable-length encoding section 105 as will be described later.

The target bit rate may be either directly specified by the user before the video starts to be recorded or automatically set by making the user select a video recording mode associated with the target bit rate. The target bit rate is an encoding condition for encoding.

Based on the target bit rate and the resolution of the picture, the determining section 212 estimates the bit allocation characteristic in the frequency space and determines the quantization matrix for use in the quantization section 204. A number of quantization matrices are prepared in advance. Examples of those quantization matrices to be selected by the determining section 212 are shown in FIGS. 4(a) and 4(b), 5(a) and 5(b) and 6(a) and 6(b). In other words, the determining section 212 selects an appropriate quantization matrix from these matrices. The processing performed by the determining section 212 will be described in detail later.

The groups of matrices shown in FIGS. 4 through 6 will be described. Specifically, FIG. 4 shows a group of matrices compliant with the MPEG-2 standard, FIG. 5 shows a group of matrices according to a test model, and FIG. 6 shows a group of matrices, of which the element values are approximately a half as large as those of the group of matrices shown in FIG. 4. The matrices shown in FIGS. 4(a), 5(a) and 6(a) are used for intra coding, while those shown in FIGS. 4(b), 5(b) and 6(b) are used for non-intra coding. Each element value of the matrix shown in FIG. 6(a) but the (1, 1) component is approximately a half as large as its associated element value of the matrix shown in FIG. 4(a). Also, each element value of the matrix shown in FIG. 6(b) is a half as large as its associated element value of the matrix shown in FIG. 4(b).

The respective matrices shown in FIGS. 4(a), 4(b), 5(a), 5(b), 6(a) and 6(b) may be stored as maximum data in the determining section 212, the quantization section 204 or a ROM or a RAM (not shown). Alternatively, those matrices may also be implemented as hardware circuits within the quantization section 204. In the latter case, the determining section 212 may determine which hardware circuit should be used and may give an instruction to switch signal paths such that the quantization process is carried out using that hardware circuit. According to the latter method, the quantization matrix can be calculated in real time, too.

Look at FIG. 3 again.

The quantization section 204 multiplies each element value of the quantization matrix that has been determined by the determining section 212 by the quantization scale that has been determined by the rate control section 211, thereby calculating a quantization parameter. The quantization parameters are also obtained as a matrix. Then, the quantization section 204 quantizes each frequency component value of the orthogonal transformation coefficient supplied from the orthogonal transformation section 103 with its associated quantization parameter (i.e., the element value of its associated matrix), thereby outputting its result as a quantized value. This quantization process is mainly performed by dividing the orthogonal transformation coefficient by the quantization parameter.

The variable-length encoding section 105 performs variable-length encoding on the quantized value that has been supplied from the quantization section 204 to output encoded picture data. If non-intra coding is going to be carried out, the variable-length encoding section 105 performs variable-length encoding on the quantized value in accordance with the information about the motion vector that has been calculated by the motion detection/motion compensation section 110, thereby outputting encoded picture data.

The inverse quantization section 106 performs inverse quantization on the quantized value that has been supplied from the quantization section 204, thereby generating an orthogonal transformation coefficient. During this inverse quantization, the same quantization parameter as that used by the quantization section 204 is used again.

The inverse orthogonal transformation section 107 performs inverse orthogonal transformation on the orthogonal transformation coefficient that has been supplied from the inverse quantization section 106, thereby generating decoded picture data. If the subtracting section 102 has selected intra coding, then the inverse orthogonal transformation section 107 generates a decoded picture with respect to the block-by-block input picture data. On the other hand, if the subtracting section 102 has selected non-intra coding, then the inverse orthogonal transformation section 107 generates a decoded picture with respect to the block-by-block predicted error picture data.

The adding section 108 adds together the decoded picture of the predicted error picture data and the block-by-block motion compensated picture data that has been supplied from the motion detection/motion compensation section 110, thereby generating definitive decoded picture data.

The reference picture memory 109 has storage capacity that is ample enough to store and retain the reference picture data for use in encoding. If intra coding is going to be carried out, the reference picture memory 109 stores, as it is, the block-by-block decoded picture data that has been generated by the inverse orthogonal transformation section 107. On the other hand, if non-intra coding is going to be carried out, the reference picture memory 109 stores the block-by-block decoded picture data that has been generated by the adding section 108. In any case, the decoded picture data stored in the reference picture memory 109 will be used as a reference picture when motion compensated inter-picture predictive coding is carried out on pictures that are going to be input after that.

The motion detection/motion compensation section 110 detects a similar block region within the specified range of the reference picture data that is stored in the reference picture memory 109 from the block-by-block input picture data that has been supplied from the input picture memory 101, and calculates a motion vector representing the magnitude of the motion of that block region. Also, based on the inter-picture predictive coding reference picture that is stored in the reference picture memory 109, the motion detection/motion compensation section 110 generates block-by-block motion compensated picture data by using the motion vector that has been calculated by the motion detection.

Next, the processing carried out by the determining section 212 will be described in detail.

Both the target bit rate and the resolution that are given to the determining section 212 are parameters that are specified by the user as encoding conditions for use in the recorder 200. FIG. 7 shows a number of exemplary encoding conditions. One of encoding conditions (1) through (3) is selected according to the combination of the target bit rate and the resolution, thereby determining the quantization matrix to adopt. In FIG. 7, the quantization matrix to adopt is identified by the drawing number just for convenience sake. In actual processing, any configuration may be adopted as long as the quantization matrix identified by the associated drawing number is adopted, and the table shown in FIG. 7 does not have to be stored actually. The same statement will apply to FIGS. 8 and 12 to be referred to later.

It should be noted that the determining section 212 selects the matrix shown in FIG. 4(a), 4(b), 5(a), 5(b), 6(a) or 6(b) depending on whether the coding process to perform is intra coding or non-intra coding. For example, if intra coding should be carried out, the determining section 212 finds the most appropriate one of the three encoding conditions (1) through (3) and then selects one of the three matrices shown in FIGS. 4(a), 5(a) and 6(a).

In the example shown in FIG. 7, one of the three encoding conditions (1) through (3) is selected according to the target bit rate. In all of these three cases, the resolution is fixed at the standard definition (SD) of 720×480.

According to the encoding condition (1), the target bit rate is 8 Mbps, which is relatively high for the resolution of 720×480. If the default matrix compliant with the MPEG-2 standard (shown in FIG. 4) were used as it is, the quantization scale determined by the rate control would often vary within a relatively low value range. That is why a quantization matrix with a small coefficient value shown in FIG. 6 is used. As a result, even if the value of the quantization scale has varied significantly according to the input picture, the bit allocation can be controlled finely with respect to the variation and the variation in image quality can be minimized.

According to the encoding condition (2), the target bit rate is 4 Mbps, which is lower than that of the encoding condition (1), for the fixed resolution of 720×480. As this is a standard encoding condition according to the MPEG-2 encoding scheme, the default matrix compliant with the MPEG-2 standard shown in FIG. 4 is used.

And according to the encoding condition (3), the target bit rate is 2 Mbps, which is relatively low for the resolution of 720×480. In general, to adjust to the target bit rate, the quantization scale tends to be set relatively large and the block noise tends to increase significantly. And if this condition is satisfied, the quantization matrix shown in FIG. 5, of which the coefficient values are large for high-frequency components, is used. Then, the quantization scale can be reduced to a relatively low level and the low-frequency component (e.g., DC components among other things) can be reproduced more accurately. That is to say, the block noise can be reduced.

Hereinafter, the features of the encoding conditions will be described. Supposing the size of the encoded data is the same according to any of the encoding conditions (1) through (3), the sequence lengths of the input moving pictures would have a ratio of one to two to four considering the ratio of their target bit rates. In other words, the encoding condition (1) is suitable for applications in which the image quality is given priority over the data size, while the encoding condition (3) is suitable for applications in which the data size is given priority over the image quality. That is why these encoding conditions (1), (2) and (3) may also be defined by mutually different recording modes, e.g., fine mode (or high quality mode), normal mode (or standard mode) and economy mode (or capacity saving mode), for example.

According to the method of determining the quantization matrix shown in FIG. 7, although the resolution is the same, a different quantization matrix can be adopted according to the application. More specifically, in an application in which high image quality is required, a quantization matrix in which the number of bits allocated varies slightly even when the quantization scale changes may be selected. Then, the deterioration of the image quality due to the variation in image quality can be minimized. On the other hand, in an application in which the data size is prioritized, a quantization matrix in which a larger number of bits are allocated to low-frequency components may be selected. Then, stabilized image quality can be provided with significant deterioration in image quality such as block noise minimized. As a result, an encoder 210 with good bit allocation characteristic can be provided.

In the example shown in FIG. 7, three particular numerical values of 8.0 Mbps, 4.0 Mbps and 2.0 Mbps are used as the target bit rates. Alternatively, a plurality of numerical value ranges may also be used. For example, 8.0 Mbps may be replaced with the range of 6.0 Mbps to 10.0 Mbps, 4.0 Mbps may be replaced with the range of 4.0 Mbps to 6.0 Mbps, and 2.0 Mbps may be replaced with the range of 2.0 Mbps to 4.0 Mbps. And the encoding condition may be defined by the range to which the target bit rate specified by the user belongs.

As described above, in such a system with multiple recording modes, the required image quality changes according to the recording mode. That is why the bit allocation characteristic in the frequency space needs to be determined with the encoding noise and deterioration in image quality due to a variation in image quality taken into account. In this preferred embodiment, the encoding condition (including the target bit rate and the resolution) is determined by the recording mode specified by the user. That is to say, the compression rate, which is an index to the complexity of encoding, is determined by the recording mode specified by the user. For that reason, it would be effective to use information about the compression rate in order to realize high image quality.

In the example shown in FIG. 7, the encoding conditions are specified for three situations where the target bit rates are different but the moving pictures have the same resolution. Alternatively, the moving pictures may have mutually different resolutions.

Exemplary encoding conditions for various situations where the target bit rates and the moving picture resolutions are both different from each other are shown in FIG. 8. The method of determining the quantization matrix shown in FIG. 8 can also cope with situations where the resolution is not 720×480.

In the table shown in FIG. 8, encoding conditions (4) through (6) are respectively the same as the encoding conditions (1) through (3) shown in FIG. 7. Encoding conditions (1) through (3) define quantization matrices for respective target bit rates about high definition (HD) video with a resolution of 1,920×1,080.

According to the frequency bit allocation characteristic shown in FIG. 8, the higher the target bit rate, the smaller the variation in the number of bits allocated with respect to varying quantization scales as in the example described above. Also, the lower the target bit rate, the greater the number of bits allocated to low-frequency components. The other encoding conditions (7) and (8) apply to a situation where a resolution of 352×480 is specified, i.e., a situation where a 720×480 video is subjected to horizontal down-sampling and then to encoding. Even so, the frequency bit allocation characteristic is also determined according to the target bit rate.

Next, the procedure of processing carried out by the encoder 210 will be described. In the following example, processing to be done in a situation where a picture is subjected to an intra coding process will be described.

Figure 9:
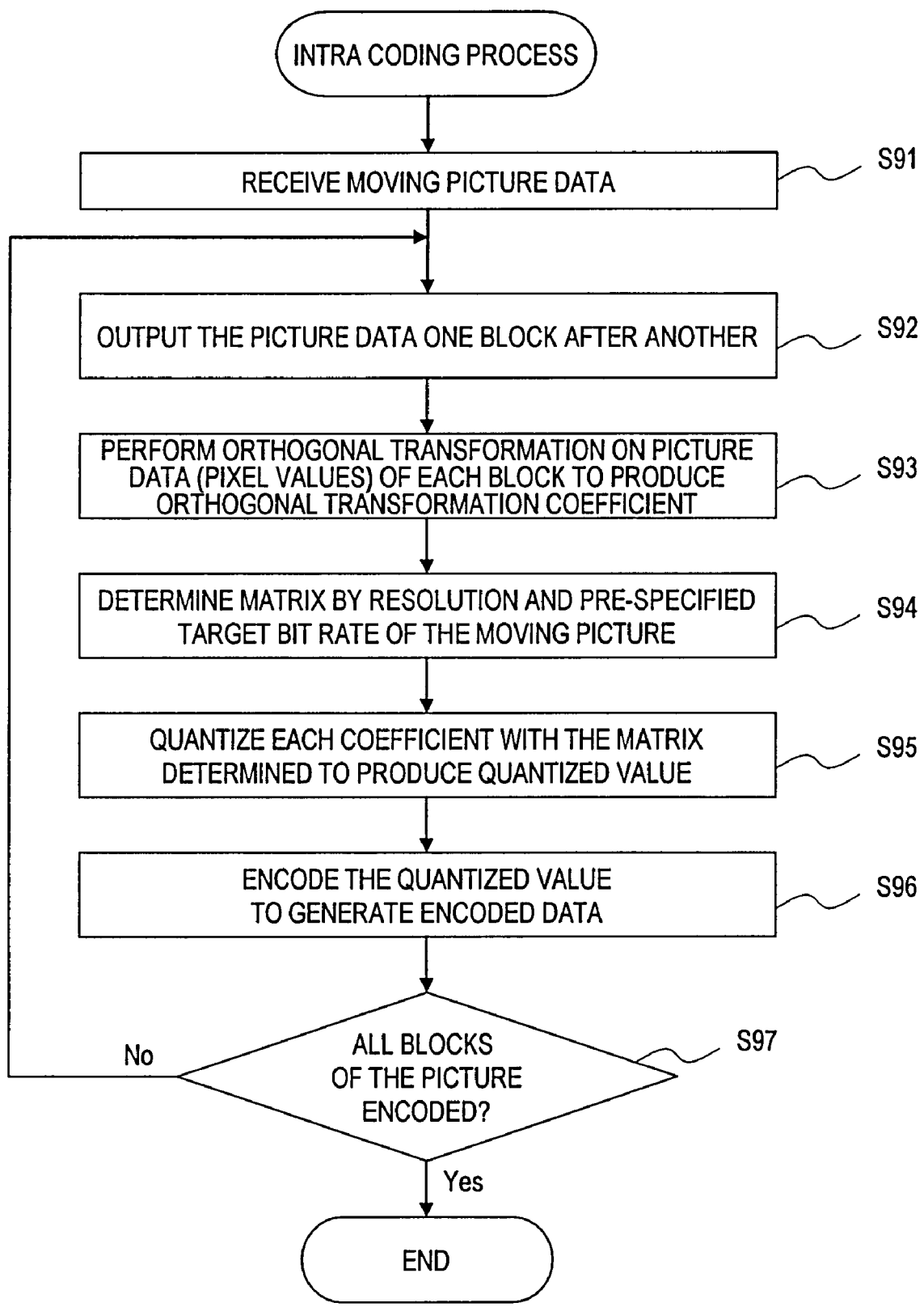
FIG. 9 is a flowchart showing the procedure of the encoding process to be carried out by the encoder 210.

FIG. 9 shows the procedure of the encoding process to be carried out by the encoder 210. First, in Step S91, the encoder 210 receives moving picture data and stores it in the input picture memory 101. Next, in Step S92, the input picture memory 101 outputs the picture data of one portion of the picture after another (i.e., on a block-by-block basis). Subsequently, in Step S93, the orthogonal transformation section 103 performs orthogonal transformation on the picture data (i.e., pixel values) of each block, thereby generating an orthogonal transformation coefficient.

Thereafter, in Step S94, the determining section 212 determines the quantization matrix by the resolution of the moving picture and the target bit rate that has been specified in advance. Then, in Step S95, the quantization section 204 quantizes each coefficient based on the matrix determined, thereby generating a quantized value. Next, in Step S96, the variable-length encoding section 105 encodes the quantized value to generate encoded data, which is then output to the storage sections 215-1, 215-2.

Finally, in Step S97, it is determined whether or not every block of that picture has been encoded yet. If not every block has been encoded yet, the processing steps S92 and so on are carried out all over again. On the other hand, if the answer is YES, the processing ends.

The procedure of the processing to be carried out by the encoder 210 has been described with reference to FIG. 9. Meanwhile, the procedure of processing to be done by the recorder 200 is easily realized by adding some processing steps to those shown in FIG. 9. Specifically, first, the processing step of receiving a video signal is added to before the processing step S91. Next, the processing step of writing the encoded data on the storage section 215-1 or 215-2 is added to after the processing step S96. Finally, the processing step of getting the same series of processing steps done in loops is added to after the YES branch of the processing step S97 such that the processing does not end until every moving picture data has been encoded completely.

In this example, the processing step S94 is carried out on a block-by-block basis. Alternatively, this processing step may also be carried out either on a picture-by-picture basis or only once when the video recording operation is started.

In the preferred embodiment described above, several combinations of target bit rates and resolutions, representing encoding conditions, have been mentioned. However, the decision may also be made by associating various quantization matrices with other combinations.

Also, in the preferred embodiment described above, a quantization matrix is associated with a combination of a target bit rate and a resolution that represent an encoding condition. Alternatively, the quantization matrix may also be determined by either the target bit rate or the resolution alone.

Furthermore, in the preferred embodiment described above, the quantization matrix is supposed to be determined by making reference to the table as defined in FIG. 7 or 8 with an appropriate combination of target bit rate and resolution representing an encoding condition. However, any other method may be adopted as long as the quantization matrix is determined based on information about the target bit rate or the resolution.

Furthermore, in the preferred embodiment described above, one of the three quantization matrices that have been stored in advance (see FIGS. 4 through 6) is selected and determined as a matrix for use in the encoding process. Alternatively, either the determining section 212 or the quantization section 204 may store a quantization matrix or two and may generate another quantization matrix in real time using that or those matrices.

Hereinafter, processing for generating a quantization matrix will be described with reference to FIG. 10. The following processing may be carried out by the determining section 212 using a software program, for example. If the quantization matrix is stored in the quantization section 204, the determining section 212 may read the quantization matrix from the quantization section 204 and perform the processing.

Figure 10:
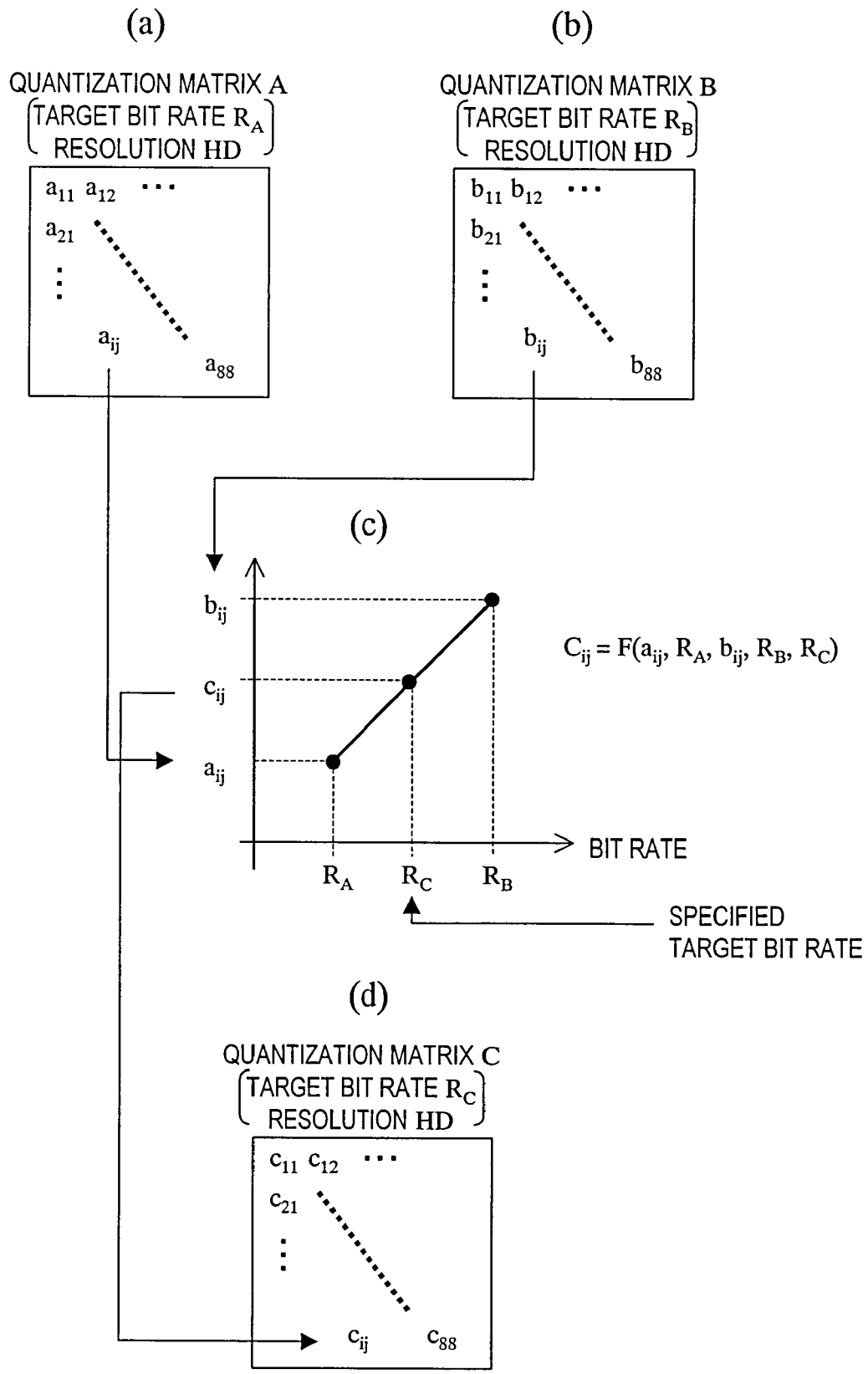
FIG. 10 schematically illustrates how to generate Quantization Matrix C based on two Quantization Matrices A and B that have been stored in advance.

FIG. 10 schematically illustrates how to generate Quantization Matrix C based on two Quantization Matrices A and B that have been stored in advance. Quantization Matrix A shown in portion (a) of FIG. 10 is supposed to be adopted when the target bit rate is $R_A$ and the moving picture has HD quality. On the other hand, Quantization Matrix B shown in portion (b) of FIG. 10 is supposed to be adopted when the target bit rate is $R_B$ and the moving picture has HD quality.

In the following example, the target bit rate $R_A$ is supposed to be the lowest bit rate processible for the encoder 210 and the target bit rate $R_B$ is supposed to be the highest bit rate.

However, this is just an example. Alternatively, the target bit rates $R_A$ and $R_B$ may be set somewhere between the highest and lowest bit rates.

For example, (i, j) element of Quantization Matrix C will be identified by $c_{ij}$. If encoding is carried out on the basis of a macroblock consisting of eight by eight pixels, i and j are natural numbers falling within the range of one through eight.

An element $c_{ij}$ may be defined as a function of its associated elements $a_{ij}$ and $b_{ij}$ of Quantization Matrices A and B and target bit rates $R_A$ and $R_B$. Portion (c) of FIG. 10 is a graph showing the function F for calculating the element $c_{ij}$, of which the abscissa represents the target bit rate and the ordinate represents the element's value.

For example, the function F may be defined as a line segment (i.e., a linear function), of which the start point is set at $(R_A, a_{ij})$ and the end point is set at $(R_B, b_{ij})$. And the element $c_{ij}$ can be calculated based on the target bit rate $R_c$ that has been specified by the user. As this function is an arbitrary one, any other function may be defined for each (i, j) element.

By figuring out the element $c_{ij}$ for every ij combination, Quantization Matrix C can be obtained. Portion (d) of FIG. 10 shows Quantization Matrix C to be adopted when the target bit rate is Rc and the moving picture has HD quality. It should be noted that there is no need to calculate all elements of Quantization Matrix C at a time. Instead, those elements may be calculated one by one during the quantization process.

In the processing described above, the two quantization matrices A and B need to be stored. However, the same processing can also be done even with a single quantization matrix. For example, the Quantization Matrix A and the step width (i.e., the increment) of element values per unit bit rate may be defined and stored in the determining section 212 in advance. In that case, when the target bit rate $R_c$ is specified, the determining section 212 can calculate respective elements of Quantization Matrix C by increasing or decreasing the element values according to the difference from the target bit rate $R_A$.

Embodiment 2

Figure 11:
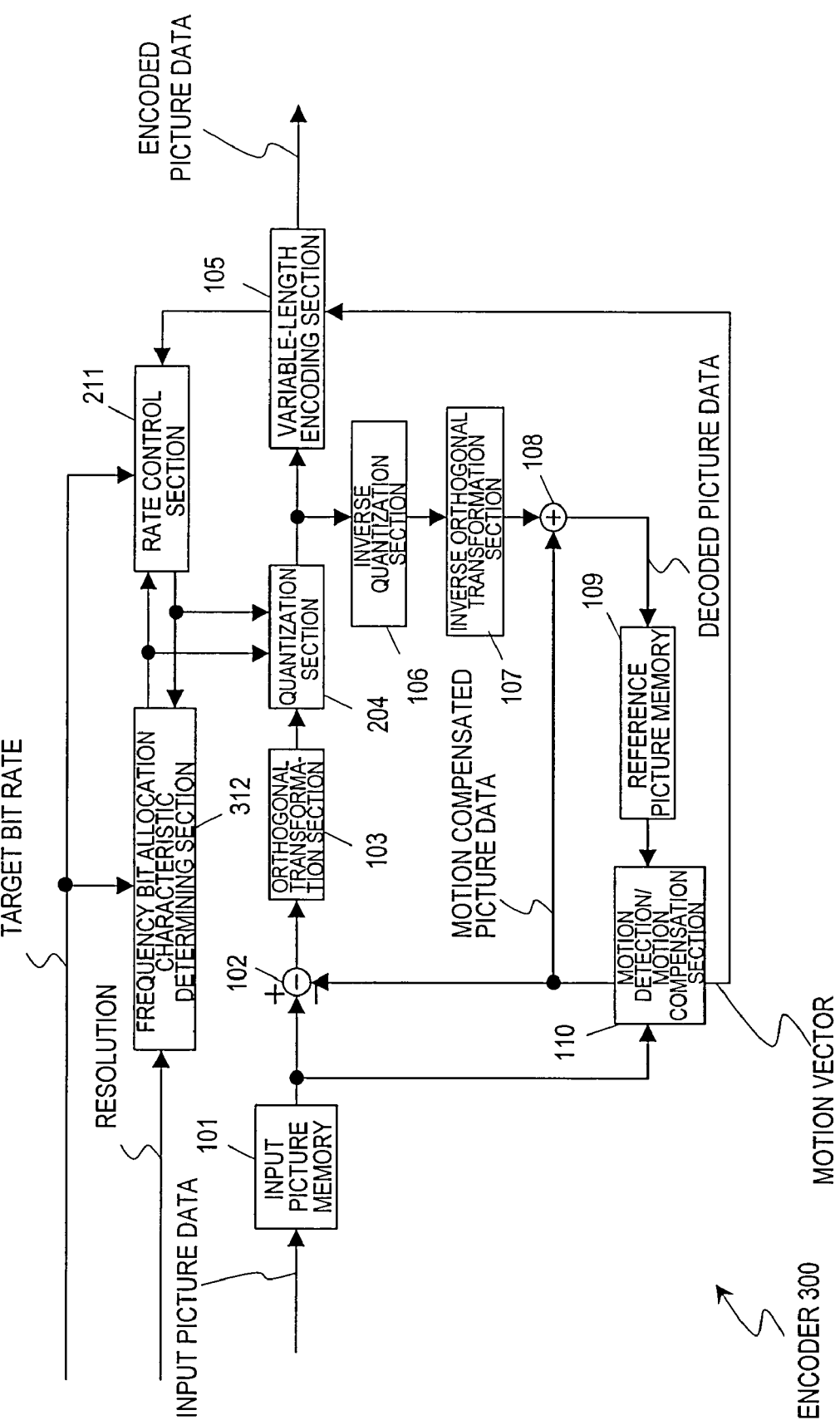
FIG. 11 shows a configuration for an encoder 300 according to a second preferred embodiment of the present invention.

FIG. 11 shows a configuration for an encoder 300 according to a second preferred embodiment of the present invention. The encoder 300 may replace the encoder 210 of the first preferred embodiment described above as an integral part for the recorder 200 shown in FIG. 3.

Hereinafter, the encoder 300 will be described. Any component of the encoder 300, having the same function as the counterpart of the encoder 210 of the first preferred embodiment described above, is identified by the same reference numeral and the description thereof will be omitted herein.

The encoder 300 includes an input picture memory 101, a subtracting section 102, an orthogonal transformation section 103, a quantization section 204, a variable-length encoding section 105, an inverse quantization section 106, an inverse orthogonal transformation section 107, an adding section 108, a reference picture memory 109, a motion detection/motion compensation section 110, a rate control section 211 and a frequency bit allocation characteristic determining section 312.

The frequency bit allocation characteristic determining section 312 (which will be simply referred to herein as the "determining section 312") calculates the bit allocation characteristic in the frequency space based on the target bit rate and the resolution, which have been specified as an encoding condition, thereby determining the quantization matrix for use in the quantization section 204. Also, in accordance with the information about the quantization scale that has been determined by the rate control section 211, the determining section 312 corrects the frequency bit allocation characteristic and changes the quantization matrices on a picture-by-picture basis.

Hereinafter, the determining section 312 will be described in detail.

FIG. 12 shows a number of encoding conditions according to this preferred embodiment. As shown in FIG. 12, two types of quantization matrices (TYPE 1 and TYPE 2) are defined for each combination of target bit rate and resolution for encoding.

Each quantization matrix of TYPE 1 has the same frequency bit allocation characteristic as the counterpart defined in the table shown in FIG. 7. When encoding is started, this quantization matrix of TYPE 1 is used.

On the other hand, each quantization matrix of TYPE 2 is used to reduce the generated code size under a predetermined condition. More particularly, the quantization matrix of TYPE 2 is used when the rate control section 211 cannot control the real bit rate, which is calculated based on the actually generated code size, to equal to or smaller than the target bit rate or when the rate control section 211 determines that the image quality has been debased significantly due to block noise.

Hereinafter, it will be described how the quantization matrices may be changed. Suppose a target bit rate of 2 Mbps has been specified at a resolution of 720×480. When the encoding process is started, one of the quantization matrices shown in FIG. 5 is used. This quantization matrix has a relatively gentle weight gradient. That is to say, the variation between multiple elements of the quantization matrix is relatively small.

Thereafter, if the bit rate cannot be controlled by the rate control section to equal to or less than the target bit rate due to the input of a series of pictures that are difficult to encode (e.g., a moving picture with high-velocity motions) or if the average low-frequency component value after the quantization is less than the predetermined threshold value, one of the quantization matrices shown in FIG. 13 is adopted. FIG. 13 shows quantization matrices, of which the quantization characteristic has an even steeper weight gradient than the TM5 quantization matrix shown in FIG. 5(a). The matrix shown in FIG. 13(a) is used for intra-coding process, while that shown in FIG. 13(b) is used for non-intra coding process. As a result, the number of bits allocated to low-frequency components increases and the deterioration of image quality can be reduced.

Figure 14:
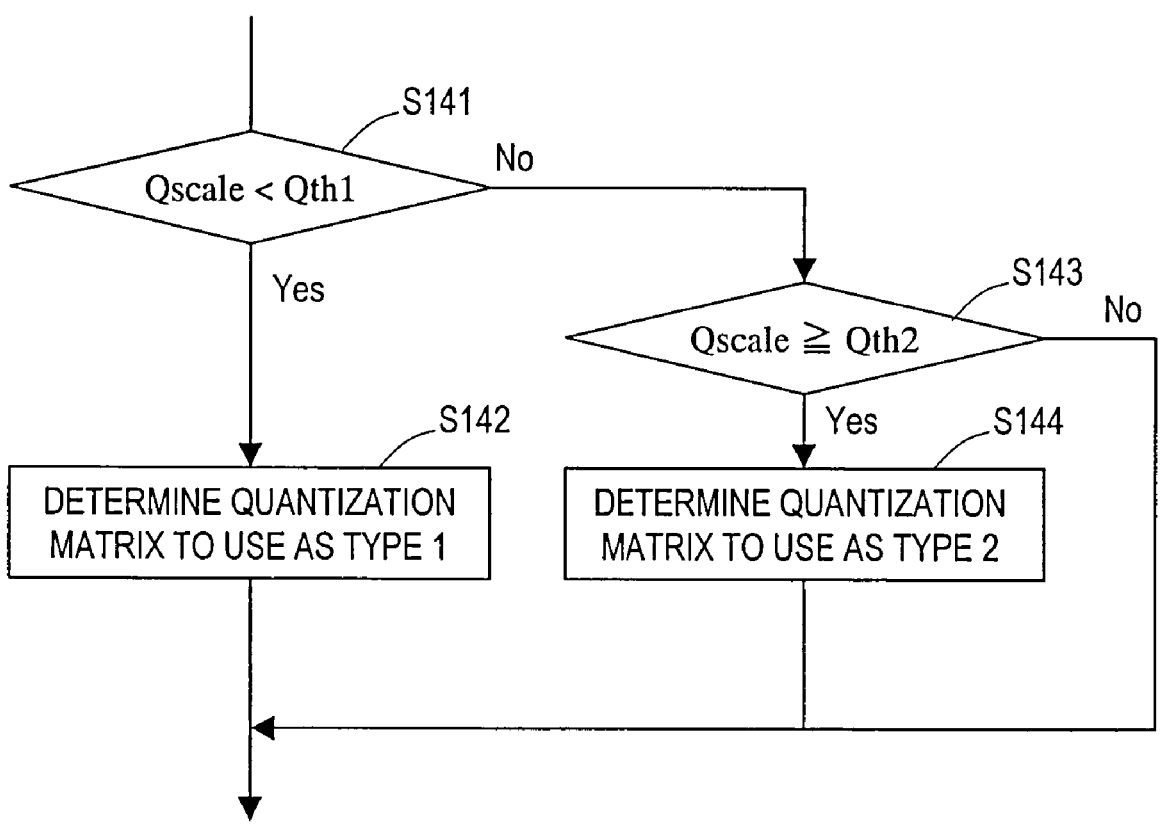
FIG. 14 is a flowchart showing an exemplary procedure of a control operation to be performed by the determining section 312 to change the quantization matrices.

FIG. 14 shows an exemplary procedure of a control operation to be performed by the determining section 312 to change the quantization matrices. When this processing is started, the quantization matrix of TYPE 1 is selected. After the encoding process has been started, the processing steps shown in FIG. 14 are performed before each picture is encoded.

First, in Step S141, the determining section 312 determines whether or not the quantization scale Qscale is smaller than a threshold value Qth1. If the answer is YES, the process advances to Step S142. Otherwise, the process advances to Step S143.

In Step S142, the determining section 312 determines the quantization matrix to use as a quantization matrix of TYPE 1. In that case, the desired rate control is realized.

On the other hand, in Step S143, the determining section 312 determines whether or not the quantization scale Qscale is equal to or greater than a threshold value Qth2. If the answer is YES, the process advances to Step S144. Otherwise, the quantization matrix that has been used for the previous picture is used as it is to make hysteresis for the change of quantization matrices. And the processing ends.

In Step S144, the determining section 312 determines the quantization matrix to use as a quantization matrix of TYPE 2. In that case, the rate control might fail or the block noise could be significant.

As can be seen easily from the description with reference to FIG. 14, the threshold values Qth1 and Qth2 are values to be used for changing quantization matrices of TYPES 1 and 2 (where Qth1≦Qth2 is supposed to be satisfied). On the other hand, Qscale is a quantization scale to be determined by the rate control section on a picture-by-picture basis.

If the quantization scale determined by the rate control is large as in the processing described above, the quantization matrices may be changed into one that quantizes high-frequency components more coarsely. Then, the quantization scale can be reduced and the deterioration of image quality due to the block noise can be minimized.

In the preferred embodiment described above, just one type of quantization matrix (TYPE 2) is defined as one that is not used when the encoding process is started (i.e., not as the quantization matrix of TYPE 1). Alternatively, two or more types of quantization matrices may be used selectively as well.

Also, in the preferred embodiment described above, decision is made about the change of quantization matrices by performing threshold value processing on the quantization scale. However, the parameter for use as a decision condition does not have to be the quantization scale as long as the parameter is correlated to the rate control.

Furthermore, in the preferred embodiment described above, the next quantization matrix is determined by reference to the table. However, any other method may also be adopted as long as the quantization matrix is determined based on information about the rate control state.

Embodiment 3

Figure 15:
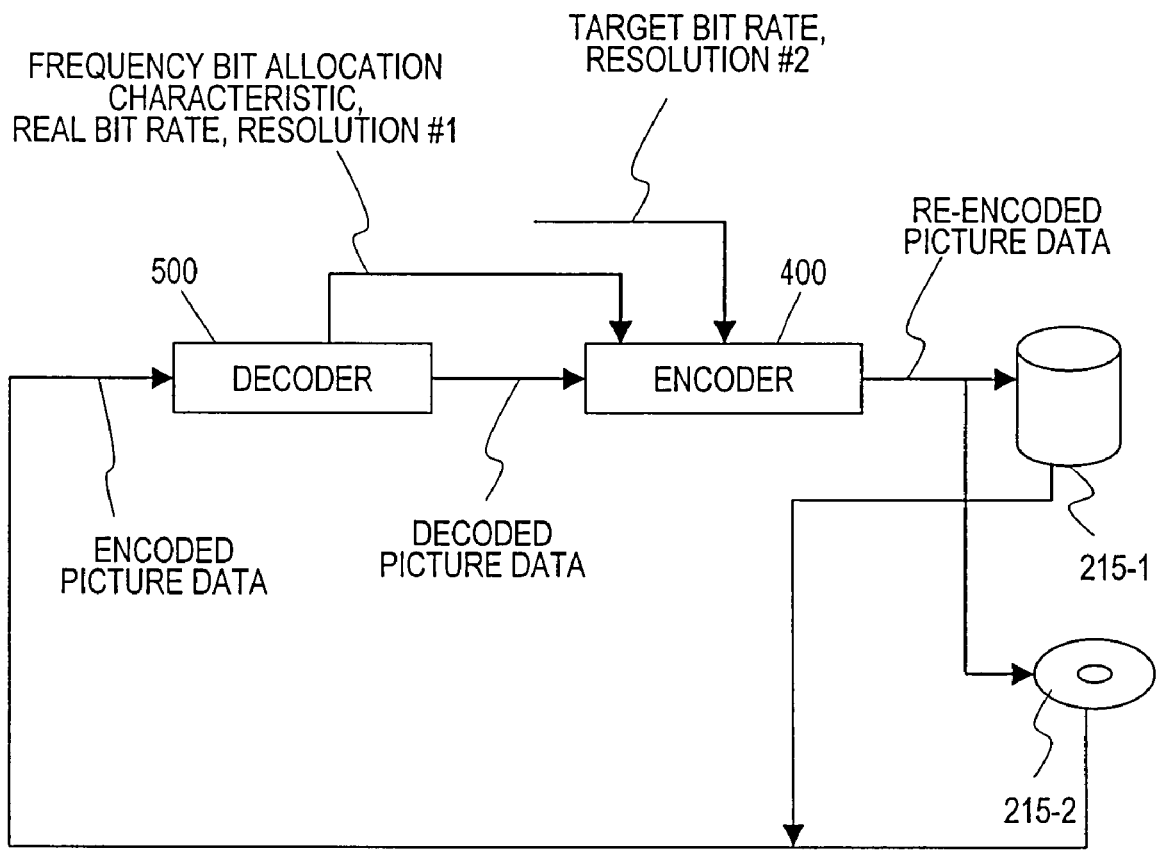
FIG. 15 shows a configuration for a recorder 250 according to a third preferred embodiment of the present invention.

FIG. 15 shows a configuration for a recorder 250 according to a third preferred embodiment of the present invention. The recorder 250 includes an encoder 400, a decoder 500 and storage sections 215-1, 215-2.

In a situation where the encoded picture data of HD-quality digital broadcast is stored in the storage section 215-1 or 215-2, the recorder 250 may be used to convert the encoded picture data into SD quality by down-sampling and then encode the data again. Alternatively, the recorder 250 may also be used to encode again the encoded picture data, which has been encoded at a relatively high bit rate, for the purpose of dubbing. During the re-encoding, the decoder 500 decodes the encoded picture data once and then the encoder 400 re-encodes the decoded picture data. Optionally, encoded picture data that is not stored in the storage section 215-1 or 215-2 may also be used.

In FIG. 15, the recorder 250 is illustrated as a single device. However, a moving picture recording system may also be set up by interconnecting the encoder 400, the decoder 500 and the storage sections 215-1 and 215-2 together as a single system.

First, the decoder 500 will be described. The decoder 500 shown in FIG. 15 decodes encoded picture data that has already been encoded, thereby generating decoded picture data. During the decoding process, the decoder 500 extracts the frequency bit allocation characteristic, the real bit rate and information about the resolution of the encoded picture data (which will be referred to herein as "information about Resolution #1").

The decoder 500 has only to perform the opposite of the encoding processing. That is why by providing a decoding section that performs the opposite type of processing compared to the variable-length encoding section 105 of the encoder 210 (see FIG. 3), an inverse quantization section 106, an inverse orthogonal transformation section 107, a reference picture memory 109 and a motion detection/motion compensation section 110, the encoded picture data can be decoded. The motion detection/motion compensation section 110 is needed to perform motion compensation-related functions.

Figure 16:
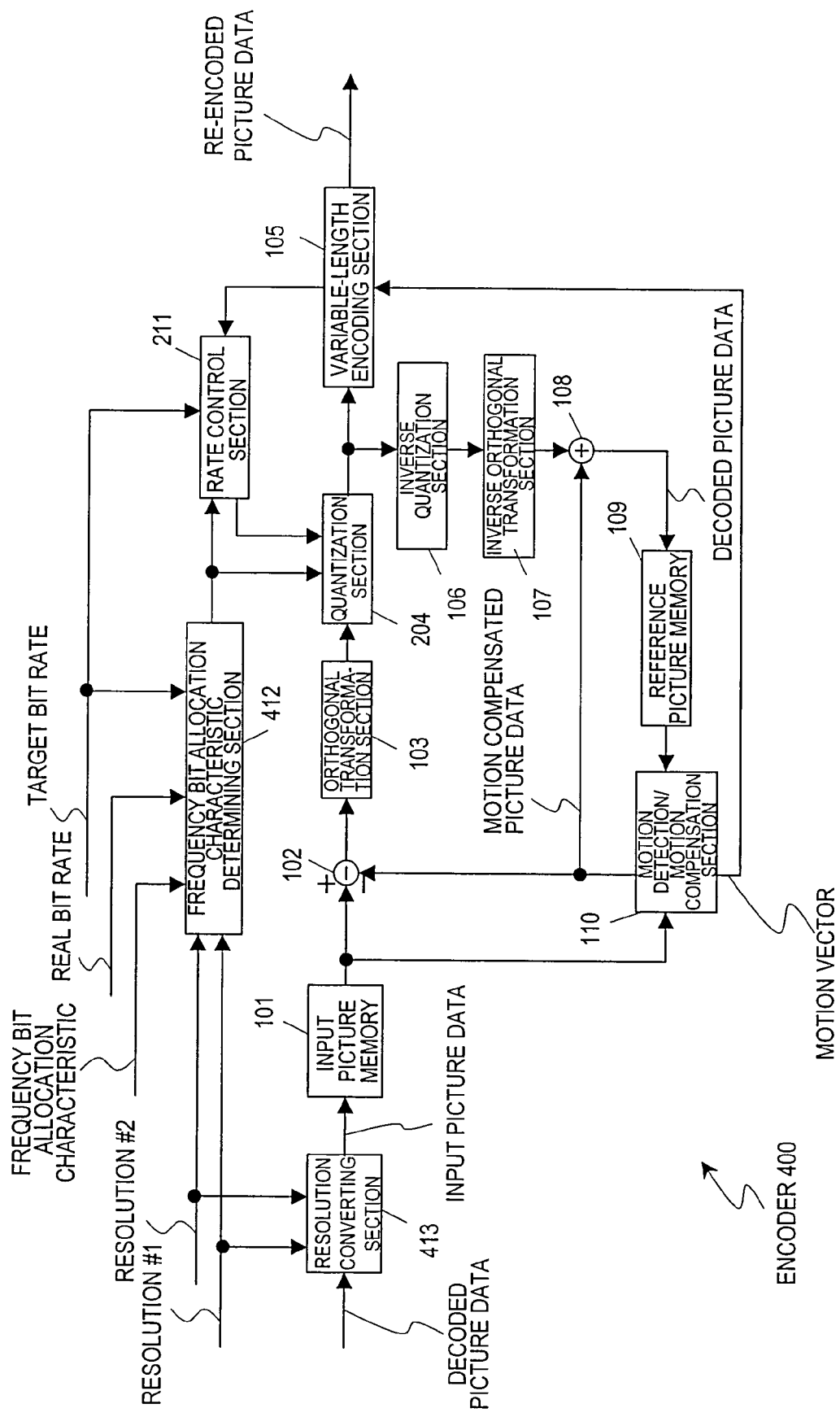
FIG. 16 shows a configuration for an encoder 400.

Next, the encoder 400 will be described. FIG. 16 shows a configuration for the encoder 400. Any component of the encoder 400, having the same function as the counterpart of the encoder 210 or 300 of the first or second preferred embodiment described above, is identified by the same reference numeral, and the description thereof will be omitted herein.

The encoder 400 includes an input picture memory 101, a subtracting section 102, an orthogonal transformation section 103, a quantization section 204, a variable-length encoding section 105, an inverse quantization section 106, an inverse orthogonal transformation section 107, an adding section 108, a reference picture memory 109, a motion detection/motion compensation section 110, a rate control section 211, a frequency bit allocation characteristic determining section 412 and a resolution converting section 413.

First, the resolution converting section 413 converts the resolution of the decoded picture data, which has been decoded by the decoder 500, based on information about Resolution #1 that has been extracted during the decoding process by the decoder 500 and information about the resolution that has been specified by the user as an encoding condition for re-encoding (which will be referred to herein as "information about Resolution #2), thereby generating input picture data for re-encoding. If no resolution conversion is carried out, then the decoded picture may be output as it is as the re-encoded input picture data.

The frequency bit allocation characteristic determining section 412 (which will be simply referred to herein as "determining section 412") gets the frequency bit allocation characteristic, the real bit rate and information about Resolution #1 of the encoded picture data from the decoder 500. Furthermore, the determining section 412 receives the target bit rate that has been specified by the user and the information about Resolution #2 as encoding condition for re-encoding. Then, based on these data, the determining section 412 determines the frequency bit allocation characteristic for re-encoding.

The determining section 412 may determine the frequency bit allocation characteristic by the following Equation (1):

$$M2\_ij = M1\_ij * (R1 * H2 * V2)/(R2 * H1 * V1) \tag{1}$$

M1_ij, R1, H1 and V1 respectively denote the frequency bit allocation characteristic, the real bit rate, the horizontal resolution and the vertical resolution of the encoded picture data yet to be decoded and M2_ij, R2, H2 and V2 respectively denote the frequency bit allocation characteristic, the target bit rate, the horizontal resolution and the vertical resolution for re-encoding. In this case, the frequency bit allocation characteristic is represented as a matrix corresponding to not only the frequency space coordinates (i, j) but also the quantization matrix for use during quantization. By using the frequency bit allocation characteristic of the encoded picture data yet to be decoded for the re-encoding process, the amount of information about frequency components, which should be lost during the re-encoding, can be reduced.

In this preferred embodiment, R1 is supposed to be the real bit rate. However, R1 may also be a bit rate that is included in management information for the encoded data yet to be decoded (e.g., a target bit rate that was used in a past encoding process).

Also, Equation 1 is just an example and the frequency bit allocation characteristic may also be calculated by any other equation. For example, the coefficient values of high-frequency components of a quantization matrix may be changed without changing the coefficient values of the DC components thereof.

The encoded picture data, generated as a result of the processes done by the decoder 500 and the encoder 400, is written on a storage medium by the storage section 215-1 or 215-2. As a result, the image quality is converted, the number of pixels in each of the pictures that form a moving picture is changed, and the bit rate is converted, for example.

The processing carried out by the encoder and the decoder described above is realized by getting a computer program executed by a general-purpose computer. Such a computer program may include instructions to carry out the processing that is defined by the flowcharts shown in FIGS. 9 and 14. The computer program may be stored in any of various types of storage media and circulated as a product on the market. Examples of preferred storage media include optical storage media such as optical disks, semiconductor storage media such as an SD memory card and an EEPROM, and magnetic recording media such as a flexible disk. Alternatively, the computer program may also be downloaded over a telecommunications network such as the Internet.

INDUSTRIAL APPLICABILITY

The moving picture encoder of the present invention can always maintain good image quality, no matter whether the target bit rate while moving picture data is being encoded is high or low. That is why the encoder of the present invention has immense practical values. Such a moving picture encoder can be either integrated together with the other circuit component on a single substrate or built into any other device, and therefore, can be used in any of various digital moving picture recorders.

The invention claimed is:

1. An encoder comprising:
a converting section for converting picture data representing a moving picture into a coefficient including a plurality of frequency components on a predetermined unit basis;
a determining section for determining a matrix to define a frequency bit allocation characteristic based on the resolution of the moving picture and a target bit rate for encoding that has been specified in advance;
a quantization section for quantizing each said coefficient based on the matrix determined, thereby generating a quantized value; and
an encoding section for encoding the quantized value to generate encoded data of the moving picture.

2. The encoder of claim 1, wherein the quantization section stores multiple types of matrices, and
wherein the determining section selects one of the matrices for use in quantization process.

3. The encoder of claim 2, wherein the quantization section includes circuits that are respectively associated with the multiple types of matrices, and
wherein the determining section instructs the quantization section to change signal paths into one leading to the circuit that is associated with the matrix for use in the quantization process.

4. The encoder of claim 1, wherein the determining section retains a condition table that defines association of multiple different combinations of resolutions and target bit rates with the multiple types of matrices and makes reference to the condition table with the resolution of the moving picture and the pre-specified target bit rate for encoding, thereby determining the associated matrix.

5. The encoder of claim 4, wherein the condition table retained in the determining section defines at least one of a particular numerical value and a particular numerical value range as the target bit rate.

6. The encoder of claim 1, wherein the quantization section stores two types of matrices that are associated with two different target bit rates, respectively, and
wherein if a specified target bit rate is different from any of the two target bit rates, the determining section makes calculations based on at least the target bit rate specified and the two types of matrices, thereby figuring out the matrix for use in the quantization process.

7. The encoder of claim 1, wherein the quantization section stores a single matrix that is associated with a particular target bit rate, and
wherein the determining section stores in advance a step value per unit bit rate, and wherein if a specified target bit rate is different from the particular target bit rate, the determining section makes calculations based on at least the target bit rate specified, the step value and the single matrix, thereby figuring out the matrix for use in the quantization process.

8. A moving picture recording system comprising:
a video signal receiving section for receiving a video signal representing a moving picture and outputting picture data to present the moving picture;
an encoder for outputting encoded data of the moving picture based on the picture data; and
a storage section for writing the encoded data on a storage medium,
wherein the encoder includes:
a converting section for converting the picture data into a coefficient including a plurality of frequency components on a predetermined unit basis;
a determining section for determining a matrix to define a frequency bit allocation characteristic based on the resolution of the moving picture and a target bit rate for encoding that has been specified in advance;
a quantization section for quantizing each said coefficient based on the matrix determined, thereby generating a quantized value; and
an encoding section for encoding the quantized value to generate encoded data of the moving picture.

* * * * *